United States Patent Office 3,200,166
Patented Aug. 10, 1965

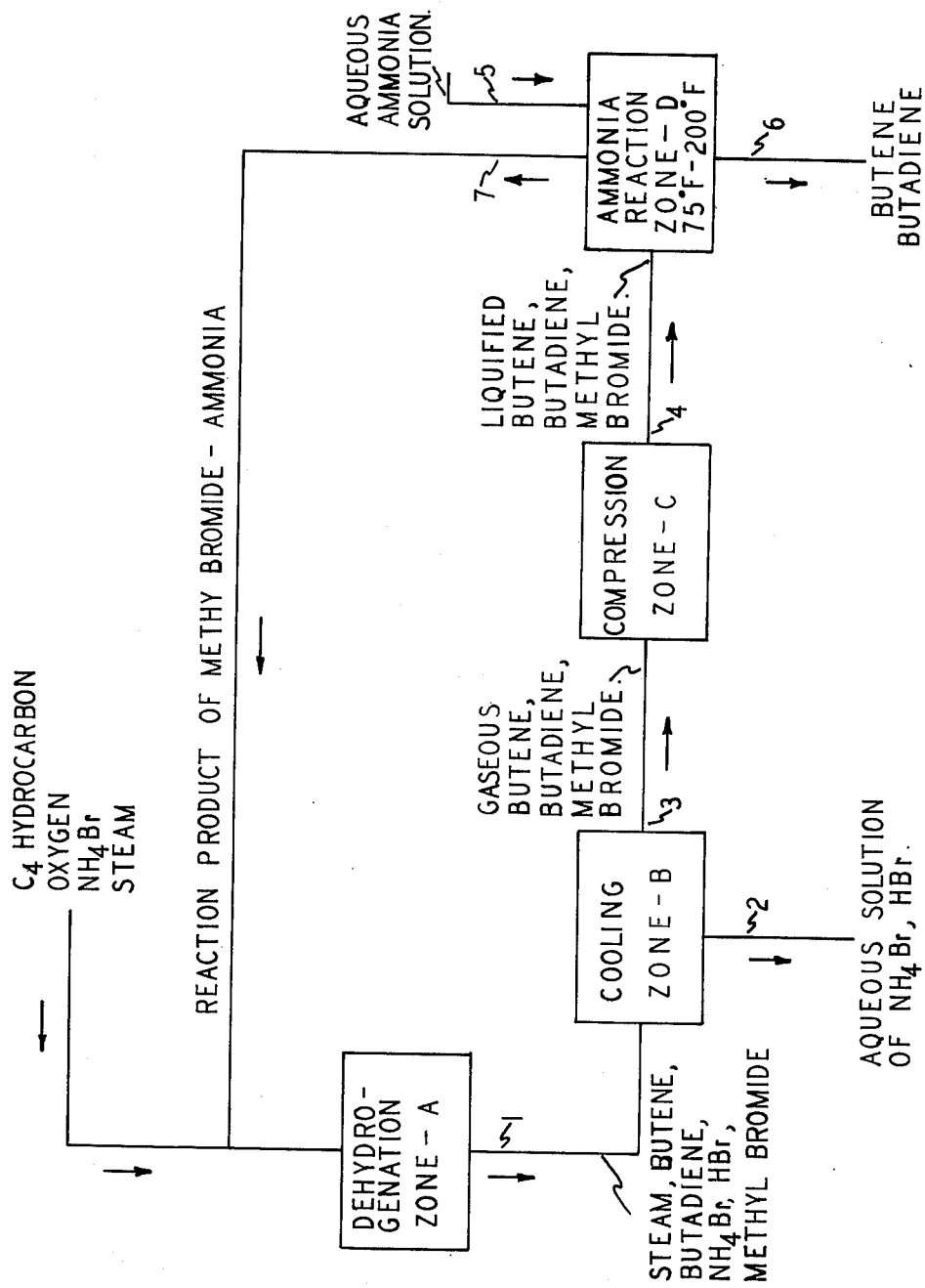

3,200,166
PURIFICATION OF UNSATURATED PRODUCT
Richard F. Bojanowski, Houston, Tex., assignor to Petro-Tex Chemical Corporation, Houston, Tex., a corporation of Delaware
Filed Mar. 13, 1962, Ser. No. 179,483
6 Claims. (Cl. 260—681.5)

This invention relates to the removal of bromine compounds from gaseous streams containing ethylenically unsaturated compounds, steam and minor amounts of inorganic and alkyl bromine compounds.

The use of bromine or a bromine liberating material as a catalyst for the dehydrogenation of hydrocarbons to diolefins has been disclosed in co-pending applications. According to these applications, unsaturated compounds such as diolefins may be produced by reacting a mixture of the compound to be dehydrogenated, oxygen and a source of bromine at an elevated temperature. The effluent from the reactor comprises the unsaturated product, some unconverted feed and small amounts of inorganic bromides. The reactor effluent also contains organic alkyl bromides such as methyl bromide. Although these alkyl bromides are present in relatively small amounts, they are serious contaminates in the product.

The problem of the removal of water soluble inorganic bromides such as HBr and $NH_4Br$ from the reactor effluent is different from that of the removal of alkyl bromides. One distinction is that the alkyl bromides behave similarly to the organic product and consequently cannot be readily washed out with water. When a hydrocarbon effluent contaminated with methyl bromide is washed with water, essentially all of the methyl bromide goes through with the washed hydrocarbon.

The removal of all of the species of bromine compounds from the reactor effluent is aggravated by the fact that the bromides may be present in relatively small amounts based on the other possible components in the effluent such as unreacted feed, products such as mono-olefins and diolefins, steam, nitrogen, oxygen and decomposition products. The bromine compounds to be recovered may amount to only a few tenths percent or less of the effluent. The methyl bromide cannot be efficiently removed from the effluent by distillation because we have found that methyl bromide forms azeotropes with other compounds such as n-butane and cis-butene-2.

It is accordingly an object of this invention to provide a method for the removal of both the inorganic and organic bromides from the reactor effluent of processes involving bromine catalysts. It is an object to reduce the total bromine content present in the product in all forms to only a few parts per million. It is also an object to provide a process for the recovery of bromine from the effluent from dehydrogenation processes utilizing bromine as a catalyst. Another object is to provide an improved process for the removal of bromine from dehydrogenation processes utilizing ammonium bromide as a catalyst. Other objects of the invention will be evident from the discussion and claims which follow.

According to this invention, I have discovered a process for the removal and recovery of essentially all of the bromine from the reactor effluent. Broadly speaking, the process comprises first condensing the water in the effluent, physically separating the inorganic bromides and free bromine in an aqueous layer, and thereafter removing the alkyl bromides such as methyl bromide by reacting the organic product mixture with excess ammonia, based on the alkyl bromides present.

One of the preferred features of the invention is illustrated in the drawing. A mixture of a $C_4$ hydrocarbon, oxygen, ammonium bromide and steam is fed to the dehydrogenation zone. The oxygen is preferably fed as air. The dehydrogenation zone A is operated at an elevated temperature and may contain a metal catalyst. The hot effluent gases leave the dehydrogenation zone A at 1. These gases will be at a temperature of greater than 450° C. The effluent gases contain steam, butene, butadiene, ammonium bromide, hydrogen bromide, methyl bromide and various other gases such as nitrogen. This hot gaseous mixture is then conducted to the cooling zone B. In the cooling zone B an aqueous solution of the inorganic bromine is removed via line 2. The remaining gaseous phase then comprises butene, butadiene, methyl bromide and minor amounts of other hydrocarbons. This gaseous stream may also contain inert gases which may be removed prior to the compression zone C. The gaseous mixture leaving the cooling zone at 3 is then conducted to the compression zone C, wherein the gaseous mixture is liquified. The liquified mixture leaves the compression zone C through line 4 and may then be conducted to the ammonia reaction zone D. In the ammonia reaction zone D an aqueous solution of ammonia in an amount equivalent to greater than 20 mols of ammonia per mol of methyl bromide entering the reaction zone is added through line 5 and is reacted with the entering liquid mixture. The temperature of reaction in the ammonia reaction zone D will be between about 75° F. and about 200° F. After a suitable reaction time in the reaction zone, the reaction product of methyl bromide and ammonia is formed and removed through line 7. This reaction product may suitably be returned to the dehydrogenation zone A as a catalyst for the dehydrogenation reaction. The purified butene and butadiene is separated through line 6. The mixture of butene and butadiene may be further separated in conventional manner.

Processes for dehydrogenation utilizing bromine catalysts are described in the co-pending application of Laimonis Bajars and Russell M. Mantell, Serial No. 856,-339 filed December 1, 1959, now abandoned, the application of Richard J. Gay, Serial No. 36,705 filed June 17, 1960 and the application of Laimonis Bajars, Serial No. 71,135 filed November 23, 1960, now abandoned. According to these processes, the compound to be dehydrogenated together with oxygen and bromine as a catalyst is reacted at elevated temperatures to form a reaction mixture comprising unreacted feed, the unsaturated product and various bromine compounds. The source of bromine may be either elemental bromine or any compound of bromine which would liberate bromine under the conditions of reaction. Suitable sources of bromine are hydrogen bromide; aliphatic bromides such as methyl bromide, 1-2-dibromo ethane, ethyl bromide, amyl bromide and allyl bromide; cyclo-aliphatic bromide such as cyclo-hexylbromide; aromatic bromides such as benzyl bromide; bromohydrins such as ethylene bromohydrin; bromo-substituted aliphatic acids such as bromo acetic acid; ammonia bromide; organic amine bromide salts such as methyl amine hydrobromide; and the like. Mixtures of various bromine compounds may be used. The preferred sources of bromine are elemental bromine, hydrogen bromide, ammonium bromide, alkyl bromides of one to six carbon atoms and mixtures thereof. The use of ammonium bromide is particularly desirable because ammonium bromide is produced from the process for removing alkyl bromides and therefore may be recycled to the feed as catalyst. The amount of elemental bromine, or the equivalent amount of bromine compound, may be as little as about 0.001 or less mol of bromine per mol of hydrocarbon to be dehydrogenated, generally no more than about 0.10 mol or 0.20 mol of bromine per mol of hydrocarbon to be dehydrogenated are necessary, although larger amounts such as 0.5 mol may be used.

The oxygen may be supplied by any source such as pure oxygen or as air. The amount of oxygen will normally be in the range of about 0.25 mol of oxygen to 1.5 or 2.5 mols of oxygen per mol of hydrocarbon to be dehydrogenated. As high as 5 mols of oxygen and higher have been employed. In relation to bromine, the amount of oxygen employed will usually be greater than 1.25 mols of oxygen per atom of bromine and normally will be greater than 1.5 mols of oxygen per atom of bromine. Usually the ratio of mols of oxygen to atoms of bromine will be from about 2 to 150 with the best results having been obtained at ratios between about 3 and 25 mols of oxygen per atom of bromine. Diluents such as steam, nitrogen, carbon dioxide or hydrocarbons may be included to reduce the partial pressure of the compound to be dehydrogenated to less than equivalent to about 10 or 15 inches of mercury absolute at a total pressure of one atmosphere. Desirable results have been obtained utilizing from about 3 to about 30 mols of steam per mol of compound to be dehydrogenated, and excellent results have been achieved with from about 5 to 20 mols of steam per mol of compound to be dehydrogenated.

These processes may be conducted in the absence of contact catalysts, but better results are obtained if the reaction is conducted in the presence of catalysts containing metal atoms of Groups Ia, Ib, IIa, IIb, IIIa, IIIb, IVa, IVb, Va, Vb, VIb, VIIb, VIIIb and the rare earth elements. The preferred catalysts are compounds of elements of Groups Ia, IIa, IIb, IIIb, IVa, IVb, Va, Vb, VIb, VIIb, VIIIb and mixtures thereof. These groups are based on the Periodic Table as found in Smith's Introductory College Chemistry, Third Edition, by William F. Ehret, copyright 1950, by Appleton-Century-Crofts, Inc. These metal atoms may conveniently be present in the forms of the elemental metal, metal oxides, metal hydroxides, metal salts, such as the halides, or metal compounds which will be converted to these forms under the conditions of reaction. Examples of catalysts would be potassium oxide, magnesium oxide, lanthanum oxide, titanium dioxide, vanadium pentoxide, chromous oxide, manganese dioxide, ferric oxide, cobaltic chloride, nickel phosphate, cuprous phosphate, zinc phosphate, stannic phosphate and bismuth trioxide.

These processes will normally be conducted at a temperature of reaction between about 450° C. to about 850° C. or higher, such as about 1000° C. The temperature of reaction is measured at the maximum temperature in the reactor. The flow rates of the reactants may be varied quite widely and can be established by those skilled in the art. Good results have been obtained with flow rates of the compound to be dehydrogenated ranging from about ¼ to 4 liquid volumes of compound per volume of reaction zone, with the volumes of liquid calculated at standard conditions of 760 mm. of mercury absolute at 25° C. If the reactor is unpacked, the reaction zone is defined as the portion of the reactor which is at a temperature of at least 400° C. If the reactor is packed, the reaction zone is defined as the volume of reactor containing packing. The residence or contact time of the reactants in the reaction zone under any given set of reaction conditions depends on all the factors involved in the reaction. Contact times such as from about 0.01 to about 5 or 10 seconds have been found to give excellent results. Generally, the contact time will be between about 0.1 and one second. Contact time is the calculated dwell time of the reaction mixture in the reaction zone assuming the mols of product mixture are equivalent to the mols of feed. The preferred compounds to be dehydrogenated are aliphatic hydrocarbons of 2 to 6 carbon atoms, which contain at least two adjacent carbon atoms, each of which carbon atom has at least one hydrogen atom attached. Good results have been achieved with a feed of at least about 50 to 75 mol percent of a mono-ethylenically unsaturated aliphatic hydrocarbon, such as the hydrocarbons of from 4 to 5 carbon atoms containing a mono-ethylenically unsaturated straight chain of at least four carbon atoms. Thus, butadiene-1,3 may be produced from butene-1 or butene-2 or mixtures thereof, and isoprene may be produced from any of the methyl butenes, such as 2-methyl butene-1, 2-methyl butene-2 or 2-methyl butene-3 or mixtures thereof. Isoprene may also be produced from methyl butanes, such as 2-methyl butane, also olefins and diolefins may be produced from saturated hydrocarbons such as butadiene and butene may be produced from n-butane. A mixture of monoolefins and diolefins may also be produced, such as a mixture of butadiene-1,3 and butenes from a feedstock of a mixture of n-butane and butene.

The effluent from the reactor may be cooled to condense the water of the effluent in any conventional manner such as by the use of tube type condensers and refrigeration. Normally, the temperature to which the effluent is cooled will be to a temperature no greater than the boiling point of water under the conditions of condensation, but will not be a temperature low enough to condense the ethylenically unsaturated organic compounds. That is, the temperature of the effluent will be cooled to a temperature of no greater than equivalent to 100° C. at atmospheric pressure.

The condensed water may be removed from the hydrocarbon vapor by the usual means known in the art such as by knock-out vessels and vapor separators. The separated water phase will contain the inorganic bromide materials such as hydrogen bromide, elemental bromide or ammonium bromide. Generally at least 90 or 95 weight percent of the inorganic bromide materials are removed prior to the treatment of the hydrocarbon phase of the effluent with ammonia.

The vapor phase from the vapor separators is usually then liquified, such as by compression, prior to further treatment to remove the alkyl bromides. The compressed gases may then be reacted with ammonia according to this invention. However, in the case for the production of butadiene it is usually desirable to first remove the $C_3$ components from the mixture. The $C_4$'s may be removed according to techniques known in the art. One technique for the removal of $C_3$'s is to use an oil absorber column. In the column the lean oil, such as naphtha, absorbs essentially all of the $C_4$ and higher hydrocarbons and the lighter fractions are taken off overhead. The fat oil from the absorber may then be stripped to remove the $C_4$ hydrocarbons from the oil. The overhead vapors may then be cooled and accumulated. The overhead from the stripper will contain concentrated butadiene contaminated with methyl bromide. In this overhead normally the concentration of butadiene will be at least 40 mol percent of the mixture and the bromide will be less than five mol percent of the mixture. The overhead from the stripper may conveniently be used as the stream to be treated wth ammonia according to this invention to remove the alkyl bromides.

The reaction between the contaminated product mixture and the ammonia may be conducted in a number of ways. The reaction may be conducted either as a batch process, continuous process or any variation thereof. Any suitable type of reaction vessel may be employed such as tanks, autoclaves, tubular reactors, and so forth. Generally, an agitator such as turbines or propellers may be used to insure sufficient contact of the reactants. However, any other means of obtaining turbulent mixing such as by the use of baffles, jets or small diameter tubes may be employed. Preferably the reactor will be jacketed to maintain the proper temperature control. Instead of using the overhead from the stripper as the feed to the ammonia reaction the fat oil from the absorber may be treated as such, although this is not preferred because larger quantities of material will have to be handled in the ammonia reactor.

The temperature of reaction is dependent upon the desired rate of reaction. Normally the temperture of reaction will be within the range of about 75° F. to about 200° F. Preferably the temperature of reaction will be within the range of about 110° F. to 180° F., with the best results having been obtained within the range of about 120° F. to about 165° F. The pressure in the reactor would usually be at least as great as the total vapor pressure of all of the components in the reactor. That is, the reaction will be conducted in liquid phase. Although excess pressure may be employed by adding gaseous diluents to the vapor phase, there is no necessity for such procedure, and generally the pressure of the reaction will simply be the total pressure generated by the reaction mixture at the particular temperature of reaction. A convenient range of reactor pressure is from about 50 p.s.i.g. to about 300 p.s.i.g., although higher or lower pressures may be employed.

The contact time in the reactor may be varied widely dependent upon such variables as desired rate of reaction, size of equipment, whether the reaction is being operated batchwise or continuously, temperature of reaction, and so forth. If the process is a batch process, the contact time will suitably be within the range of about one minute to twenty-five minutes with the best results having been obtained at contact times of about four minutes to about fifteen minutes. When the process is operated continuously, the contact times are somewhat longer, such as from about four minutes to forty or fifty minutes. If desired, shorter or longer contact times may be utilized.

Catalysts for the reaction with ammonia are not necessary; nevertheless, in some instances the rate of reaction may be increased by the addition of any of the catalysts known in the art to the reaction of ammonia with alkyl halides. Among the suitable catalyst compounds are silver or copper compounds, such as cupric chloride.

Water may be either present or excluded from the reaction. The preferred method is to conduct the process with some water present. Excellent results have been obtained by reacting the hydrocarbon effluent with ammonia solution containing from about 5 to about 80 weight percent ammonia, based on the water. A suitable concentration of ammonia is between the range of about 15 to 50 weight percent of ammonia based on the water. It has been found that when an aqueous solution of ammonia is utilized, that much less of the ammonia remains in the hydrocarbon layer after the reaction has been completed. Other liquids may be present or added to the reaction mixture. In some instances hydrocarbon solvents, alcohols such as the aliphatic monohydric and dihydric alcohols containing from 1 to 6 carbon atoms, and the like have been employed to advantage.

It is a feature of this invention that the ammonia must be present in excess over the amount stoichiometrically required to react with all of the alkyl bromides present. The ammonia will be present in an amount of at least about 20 mols of ammonia per mol of alkyl bromides present in the reactor effluent, and these will normally be at least about 40 mols of ammonia based on the total mols of alkyl bromides present. Desirable results have been obtained with ratios of ammonia to alkyl bromides of between about 50 to 5,000 with excellent results having been obtained within the range of about 150 to 3,000 mols of ammonia based on the total mols of alkyl bromides in the effluent.

If an aqueous solution of ammonia is used, after the reaction with ammonia has taken place the organic phase may be separated from the aqueous phase by allowing the phases to separate in a tank or other phase separator. The aqueous phase will contain ammonia, alkyl amines and ammonium bromide. This ammonium bromide formed by the reaction of the methyl bromide with ammonia may be fed to the dehydrogenation reactor to function as catalyst for the dehydrogenation reaction. This may be accomplished by concentrating the ammonium bromide and returning the concentrated solution of ammonium bromide to the reactor. The ammonium bromide may be concentrated by stripping off the free ammonia and some of the water. Another method for concentrating the ammonium bromide is to recycle the aqueous solution of ammonia containing ammonium bromide to the ammonia reactor. By so doing additional ammonium bromide is found in the aqueous phase. Thus, not only are the alkyl bromides, such as methyl bromide, removed from the organic product but the bromine has been recovered in useful form for use as a catalyst.

After the reaction with ammonia the organic phase has been analyzed for bromides and no bromide was detected by chromatograph. This would mean that the alkyl bromides are present at less than 50 parts per million, and probably less than 25 parts per million based on the organic phase.

A well known method for the purification of the butadiene is the process of selective absorption with a cuprous salt solution. The butadiene is preferentially absorbed in the cuprous salt solution and after the other hydrocarbons have been stripped off, the butadiene is stripped off.

EXAMPLES n Butene-2 was dehydrogenated to butadiene-1,3. A hydrocarbon composition containing 85.0 mol percent n-butene-2, with the remainder being minor amounts of n-butane, butadiene, isobutylene, propylene, and pentane was fed to a fixed bed reactor containing a catalyst composed of by weight about 75 percent ferric oxide and 25 percent MgO. The feed to the reactor contained oxygen fed as air in an amount of 0.7 mol of oxygen per mol of butene. The bromine catalyst was fed as ammonium bromide in an amount equal to 0.02 mol of $Br_2$ per mol of butene. The maximum bed temperature of the reactor was about 680° C. The flow rate of butene was 1.0 LHSV (liquid volumes of butene per volume of reactor packed with catalyst per hour). The reactor feed contained 11 mols of steam per mol of butene. Excluding the water, the effluent from the reactor contained on a molar percentage basis, about 65 percent nitrogen, 20 percent butadiene, 1.0 percent carbon monoxide, 2.5 percent carbon dioxide, 3.7 percent unreacted butene, 0.04 percent methyl bromide and 0.94 mol percent ammonium bromide. The remainder was composed of oxygen and oxygenated hydrocarbons such as acrolein, saturated hydrocarbons such as n-butane, olefins such as ethylene and isobutylene, and acetylenic hydrocarbons such as vinyl acetylene. The effluent also contained the 11 mols of steam per mol of butene fed to the reactor together with steam formed during the reaction. Approximately 0.83 mol of steam was formed in the reaction per mol of butene fed to the reactor. The reactor effluent was cooled to essentially completely condense the steam. The aqueous phase was then separated from the hydrocarbon in a phase separator. The temperature of the cooled aqueous phase was about 50° C. Greater than 96 weight percent of the inorganic bromides present in the reactor effluent remained in the aqueous layer.

The hydrocarbon phase of the effluent containing the methyl bromide as a contaminant was then passed to a compressor to compress the hydrocarbon gases. The compressed gases were then conducted to an oil absorber. In the absorber the lean oil absorbed essentially all of the $C_4$ and heavier hydrocarbons, with the lighter gases going off overhead. The fat oil was removed from the bottom of the absorber and sent to a stripper to remove the hydrocarbon from the lean oil. The overhead from the stripper contained, on a mol percent basis, about 71.2 percent butadiene, 12.3 percent n-butene-2, 7.2 percent n-butane, 0.13 percent methyl bromide, together with minor amounts of carbon dioxide, ethylene, propylene, propyne, vinyl acetylene, isobutylene and $C_5$ and higher hydrocarbons.

In the following examples the overhead from the stripper was the contaminated mixture which was treated with ammonia according to this invention. All of the examples were conducted in a stirred autoclave. In all of the examples except Examples 7 and 8, a turbine-type stirrer was used. In Examples 7 and 8, a propeller-type stirrer was employed. Vigorous agitation was employed in all of the examples. The aqueous ammonia solution was first placed in the autoclave and heated to a temperature of reaction and then the hydrocarbon to be treated was added. The autoclave was closed and the pressure of reaction was equal to the vapor pressure of the composition at the temperature of reaction. The percent of methyl bromide was determined chromatographically. The sample analyzed was taken from a dip tube in the autoclave with the dip tube extending below the liquid line in the reactor.

*Example 1*

The aqueous ammonia solution contained 10 percent ammonia and the temperature of reaction of the hydrocarbon with ammonia was from 70° C. to 80° C. The volume ratio of the above described contaminated hydrocarbon to aqueous ammonia solution was 1 to 1. After 10 minutes of agitation, the phases were separated and the liquid hydrocarbon was analyzed for methyl bromide. No methyl bromide was detected in the hydrocarbon phase.

*Example 2*

A 10 percent by weight ammonia aqueous ammonia solution was used as the treating solution. The volume ratio of hydrocarbon to aqueous ammonia solution was 1 to 2, and the temperature of reaction was 65° C. to 75° C. After 10 minutes of agitation, no methyl bromide was detected in the hydrocarbon phase.

*Example 3*

An aqueous ammonia solution containing 30 percent by weight ammonia was used with an equal volume of hydrocarbon to be treated. The temperature of reaction with ammonia was 65° C. to 90° C. After 7 minutes of reaction no methyl bromide was detected in the hydrocarbon phase. The aqueous phase was allowed to separate in a tank and was removed from the hydrocarbon phase.

*Example 4*

An aqueous solution of ammonia containing 15 percent by weight ammonia was used together with an equal volume of hydrocarbon to be treated. The temperature of reaction was from 80° C. to 100° C. After six and one-half minutes of agitation, no methyl bromide was detected in the hydrocarbon phase.

*Example 5*

An aqueous solution of ammonia containing 30 percent by weight of ammonia was used as a treating agent. The volume ratio of hydrocarbon to aqueous ammonia solution was 2 to 1. The temperature of reaction was 85° C. After about 15 minutes of reaction, all of the methyl bromide was removed from the hydrocarbon phase. The aqueous phase contained ammonium bromide as the reaction product of the reaction of ammonia with methyl bromide. This solution was then fed back into the inlet for the dehydrogenation reactor. The amammonium bromide was thus effectively reused as the dehydrogenation catalyst.

*Example 6*

In Examples 6, 7 and 8 the hydrocarbon was not stripped from the lean oil, but rather the hydrocarbon absorbed in the lean oil was treated with ammonia. The lean oil used was vinyl cyclohexene with two parts of vinyl cyclohexene per volume of absorbed hydrocarbon.

The volume ratio of hydrocarbon to aqueous ammonia solution was 1 to 1, with the aqueous ammonia solution containing 30 percent by weight ammonia. The temperature of reaction was 60° C. to 65° C., after six minutes of reaction, no methyl bromide was detected in the hydrocarbon phase.

*Example 7*

The aqueous ammonia solution contained 30 percent by weight ammonia and was used in a 1 to 1 volume ratio of the hydrocarbon to be treated. The temperature of reaction was 60° C. to 70 C. After about 12 minutes of reaction, no methyl bromide was detected in the hydrocarbon phase.

*Example 8*

The temperature of reaction was 65° C. The aqueous ammonia solution contained 30 percent by weight ammonia. The volume ratio of hydrocarbon to aqueous ammonia solution was 4 to 1. After about 16 minutes of reaction, no methyl bromide was detected in the hydrocarbon phase.

*Example 9*

The procedure of Example 2 was repeated with the exception that to the aqueous ammonia solution was added 25 percent by volume, based on the aqueous ammonia solution, of isopropanol. Again after the treatment no methyl bromide was detected in the hydrocarbon.

*Example 10*

The procedure of Example 2 was repeated with the exception that the aqueous ammonia solution also contained 10 percent by weight of the water of ammonium bromide. At the end of 10 minutes the hydrocarbon was analyzed and no methyl bromide was detected.

*Example 11*

Example 2 was repeated with the exception that copper chloride in an amount of 1.0 percent by weight of the total mixture was added as a catalyst. At the end of 10 minutes no methyl bromide was detected in the hydrocarbon phase.

Although the process for the removal of alkyl bromides has been described utilizing an effluent from a process for the dehydrogenation of hydrocarbons with bromine containing materials, the invention is applicable to other processes wherein a similar effluent is obtained. The process is characteristically adapted for the removal of alkyl bromides of from one to six carbon atoms from hydrocarbon mixtures which contain olefins or diolefins. The process of the invention is also applicable for the removal of alkyl bromides from the reaction product of the cracking of hydrocarbons such as 2-methyl pentene-2 to isoprene. Compositions contaminated with alkyl bromides useful for treatment according to this invention may be such as the entire effluent from a reactor, or after condensation of steam the hydrocarbon phase, such as butadiene, may be split into fractions with one of the fractions containing most of the alkyl bromides and this latter fraction treated according to this invention. The invention may advantageously be employed on mixtures containing at least about 50 mol percent olefins, diolefins and mixtures thereof, generally at least 50 mol percent of diolefins of from 4 to 6 carbon atoms, together with less than 5 mol percent inorganic water soluble bromides and 5 mol percent alkyl bromides. Excellent results have been obtained on a mixture comprising aliphatic hydrocarbons of at least about 40 mol percent of 4 to 6 carbon atom diolefins contaminated with less than 0.5 mol percent of methyl bromide, based on the diolefins such as butadiene.

The amount of alkyl bromide will be a minor amount based on the total contaminated stream, with the mol percent of methyl bromide generally being less than 10 mol percent with the mol percent more often being less than two mol percent.

I claim:

1. A process for the removal of bromine compounds from a gaseous mixture comprising ethylenically unsaturated organic compounds and steam, the said mixture being contaminated with inorganic bromine and methyl bromide, which comprises (1) cooling the gaseous mixture to condense an aqueous phase containing inorganic bromine, (2) separating the condensed aqueous phase containing inorganic bromine, (3) liquifying the remaining gaseous mixture of methyl bromide and ethylenically unsaturated organic compounds, (4) contacting the liquified mixture of methyl bromide and ethylenically unsaturated organic compounds at a temperature within the range of about 75° F. to about 200° F. with ammonia in an amount of at least 20 mols of ammonia per mol of methyl bromide, and (5) separating the reaction product of the methyl bromide with ammonia from the ethylenically unsaturated organic compounds.

2. A process for the removal of bromine compounds from a gaseous mixture comprising ethylenically unsaturated aliphatic hydrocarbons of 2 to 6 carbon atoms and steam, the said mixture being contaminated with inorganic bromine compounds and methyl bromide, which comprises (1) cooling the gaseous mixture to condense an aqueous phase containing inorganic bromine, (2) separating the condensed aqueous phase containing inorganic bromine, (3) liquifying the remaining gaseous mixture of methyl bromide and ethylenically unsaturated organic compounds, (4) contacting the liquified mixture of methyl bromide and ethylenically unsaturated organic compounds at a temperature within the range of about 75° F. to about 200° F. with ammonia in an amount of at least 20 mols of ammonia per mol of methyl bromide, and (5) separating the reaction product of the methyl bromide with ammonia from the ethylenically unsaturated organic compounds.

3. A process for the removal of bromine compounds from a gaseous mixture comprising ethylenically unsaturated aliphatic hydrocarbons of 2 to 6 carbon atoms and steam, the said mixture being contaminated with inorganic bromine compounds and methyl bromide, which comprises (1) cooling the gaseous mixture to condense an aqueous phase containing inorganic bromine, (2) separating the condensed aqueous phase containing inorganic bromine, (3) liquifying the remaining gaseous mixture of methyl bromide and ethylenically unsaturated organic compounds, (4) contacting the liquified mixture of methyl bromide and ethylenically unsaturated organic compounds at a temperature within the range of about 75° F. to about 200° F. with ammonia in an amount of at least 40 mols of ammonia per mol of methyl bromide, and (5) separating the reaction product of the methyl bromide with ammonia from the ethylenically unsaturated organic compounds.

4. A process for the production of unsaturated aliphatic hydrocarbons which comprises (1) passing a gaseous mixture of aliphatic hydrocarbon compound, a bromine liberating compound as a catalyst, and steam through a reactor at a temperature of at least 450° C. to produce a reactor effluent comprising a mixture of unsaturated aliphatic hydrocarbons and steam contaminated with both inorganic bromine and methyl bromide, (2) cooling the gaseous mixture to condense the steam into an aqueous phase containing inorganic bromine, (3) separating the condensed aqueous phase containing at least 90 weight percent of the inorganic bromine from the gaseous mixture of unsaturated aliphatic hydrocarbons and methyl bromide, (4) liquifying the mixture of aliphatic hydrocarbons and methyl bromide, (5) contacting the mixture of methyl bromide and aliphatic hydrocarbons at a temperature of about 75° F. to about 200° F. with ammonia in an amount of at least 20 mols of ammonia per mol of methyl bromide to form the reaction product of ammonia and methyl bromide and (6) separating the said reaction product from the said liquified aliphatic hydrocarbons.

5. A process for the production of butadiene-1,3 which comprises (1) passing a gaseous mixture of an aliphatic hydrocarbon compound, a bromine liberating compound as a catalyst and steam through a dehydrogenation reactor at a temperature of at least 400° C. to produce a reactor effluent comprising a mixture of unsaturated aliphatic hydrocarbons and steam contaminated with both inorganic bromine and methyl bromide, (2) cooling the gaseous mixture to condense the steam into an aqueous phase containing inorganic bromine, (3) separating the condensed aqueous phase containing the inorganic bromine from the gaseous mixture of aliphatic hydrocarbons and methyl bromide, (4) liquifying the mixture of aliphatic hydrocarbons and methyl bromide, (5) contacting the liquified mixture of methyl bromide and aliphatic hydrocarbons with ammonia at a temperature of about 75° F. to about 200° F., with the ammonia being in an amount of at least 20 mols of ammonia per mol of methyl bromide to form a reaction product of ammonia and methyl bromide, (6) separating the said reaction product from the said liquified aliphatic hydrocarbons and (7) feeding the separated reaction product to the said dehydrogenation reactor as a catalyst.

6. A process for the production of butadiene-1,3 which comprises (1) passing a gaseous mixture of butene, a bromine liberating compound as a catalyst in an amount of from 0.001 to 0.20 mol of bromine per mol of said butene, and steam in an amount of about 3 to 30 mols of steam per mol of said aliphatic compound through a dehydrogenation reactor at a temperature of at least 450° C. to produce a reactor effluent comprising a mixture of butadiene-1,3 and steam contaminated with both inorganic and methyl bromide compounds, (2) cooling the gaseous mixture to a temperature of no greater than equivalent to 100° C. at atmospheric pressure to condense the steam into an aqueous phase containing inorganic bromine, (3) separating the condensed aqueous phase containing at least 95 weight percent of the inorganic bromine from the gaseous mixture comprising butadiene-1,3 and methyl bromide, (4) liquifying the gaseous mxiture comprising butadiene-1,3 and methyl bromide, (5) contacting the liquified mixture comprising butadiene-1,3 and less than 5 mol percent methyl bromide with ammonia at a temperature of about 75° F. to about 200° F. and at a contact time of about one minute to twenty-five minutes, with the ammonia being in an amount of at least 20 mols of ammonia per mol of methyl bromide to form a reaction product of ammonia and methyl bromide, (6) separating the said reaction product from the said butadiene-1,3 and (7) feeding the separated reaction product to the said dehydrogenation reactor as a catalyst.

References Cited by the Examiner

UNITED STATES PATENTS 2,867,671   1/59   Mullineaux et al. _____ 260—683.3
2,901,520   8/59   Raley et al. _____ 260—683.3

ALPHONSO D. SULLIVAN, *Primary Examiner.*